United States Patent

[11] 3,546,421

[72] Inventors Charles F. Meyer, Wauwatosa, and
Marvin A. Guettel, Milwaukee, Wis.
[21] Appl. No. 745,866
[22] Filed July 18, 1968
[45] Patented Dec. 8, 1970
[73] Assignee Square D Company, Park Ridge, Ill.,
a corporation of Michigan

[54] CONTROL FOR COMPENSATING FOR THE EFFECTS OF PROGRESSIVE MUSHROOMING OF THE ELECTRODES IN A RESISTANCE WELDER APPARATUS
10 Claims, 2 Drawing Figs.

[52] U.S. Cl. .................................................. 219/110, 219/111
[51] Int. Cl. ....................................................... B23k 11/24
[50] Field of Search ........................................... 219/108– –111, 114

[56] References Cited
UNITED STATES PATENTS
2,967,227 1/1961 Mierendorf et al.
3,410,983 11/1968 Deutsch et al.

*Primary Examiner*—Joseph V. Truhe
*Assistant Examiner*—J. G. Smith
*Attorneys*—Harold J. Rathbun and William H. Schmeling

ABSTRACT: A control for a resistance welder apparatus which will detect the deterioration in quality of successive spot welds as caused by progressive mushrooming of the welder electrodes and will automatically change the weld schedule of the apparatus to compensate for the effect on the weld quality produced by the mushroomed electrodes.

INVENTOR.
CHARLES F. MEYER
MARVIN A. GUETTEL
BY William H. Schmeling

CONTROL FOR COMPENSATING FOR THE EFFECTS OF PROGRESSIVE MUSHROOMING OF THE ELECTRODES IN A RESISTANCE WELDER APPARATUS

This invention relates to electrical control systems and more particularly, to an improved resistance welder control system which provides an output signal in response to a change in resistance between metal workpieces during the formation of a resistance weld and uses the signal to control the quality of the weld and to detect the deterioration in quality of successive weld spots as caused by the progressive mushrooming of the welder electrodes and automatically change the weld schedule to compensate for the detected deterioration.

As presently available, resistance welder controls are capable of precisely determining welding time periods as well as the rate of welding current flow so that improperly adjusted controls will cause incorrect weld time periods and current levels to be reproduced with the same precision as correct time periods and current levels. Because the quality of a weld is influenced by many variables, including electrode tip mushrooming, and as presently known, there are no reliable nondestructive tests to determine the quality of welds after the weld has been formed, manual empirical adjustments of the functions of the control are usually made to compensate for the effects caused by mushrooming of the welding electrode tips on the quality of the welds.

It has been known for a number of years that the strength of a resistance weld is related to a resistance change which occurs between the workpieces during the formation of the weld nugget, and that a signal related to the resistance change can be obtained by connecting a pair of leads to the electrodes in as close proximity to the workpieces as is practical. The signal thus obtained, however, has a magnitude which is not only dependent upon the resistance between the workpieces, but also is influenced by the magnitude of other variables. A control for measuring the critical resistance between the workpieces independently of the other variables is disclosed in a U.S. Pat. No. 3,345,493, issued Oct. 3, 1967, which has been assigned by the inventors Marvin A. Guettel and Charles F. Meyer to the assignee of the present invention.

Modern production practices, as for example those followed in the assembly of motor vehicles on an assembly line, dictate that interruptions due to equipment malfunction or breakdown are intolerable. Thus, when a spot welder apparatus is used to secure metal parts together which are carried on an assembly line, the spot welder apparatus must function without interruption during all periods when the assembly line is operating. Conventionally, in some assembly line operations, the line is operated continuously with interruptions occurring only at the end of a work period or work shift when the persons working on the line are rotated. It is well known that as repeated spot welds are made by a pair of welding electrodes, the portions of the electrodes engaging the workpieces will progressively deform and assume a shape commonly referred to as a "mushroom," which causes the quality of successive welds to progressively deteriorate. To overcome the effects of the mushroomed electrodes between the intervals when they cannot be serviced or replaced without stopping the assembly line, the practice which has been followed is to count the number of welds the tips have made and increase the duration or intensity of the welding current through the electrodes after the tips have formed an arbitrary number of welds. Thus the compensation for mushrooming welder electrodes as heretofore practiced was made solely in an arbitrary manner based upon past experience and testing without taking into consideration other variables which may be influencing the quality of the welds which were currently being formed. In the control according to the present invention, the change in resistance between the workpieces being welded is used to control both the quality of each weld spot as it is formed and to maintain the quality for repeated successive weld spots in spite of deterioration in the quality which otherwise might occur due to mushrooming of the electrodes forming the weld spots.

It is an object of the present invention to provide a control system for a resistance welder which will automatically change the operation of the resistance welder to compensate for the effects produced by the mushrooming of the welding electrodes.

Another object is to provide a control system for a resistance welder with a means which responds to the change in resistance between the workpieces and terminates the flow of welding current when a predetermined change in resistance between the workpieces has occurred during a preselected time interval and which changes the magnitude of welding current through the electrodes in incremental steps after a predetermined number of successively formed welds have been made which failed to produce the required change in resistance.

Another object is to provide a control system for a resistance welder with a means which responds to the change in resistance between the workpieces and terminates the flow of welding current when a predetermined change in resistance between the workpieces has occurred during a preselected time interval and which changes the time interval during which welding current may be delivered through the electrodes after a predetermined number of successively formed welds have been made which failed to produce the required change in resistance.

Another object is to provide a control system for a resistance welder with a means which responds to the change in resistance between the workpieces and terminates the flow of welding current when a predetermined change in resistance between the workpieces has occurred during a preselected time interval and which changes the weld time interval and the intensity of welding current through the electrodes in incremental steps after a predetermined number of successively formed welds have been made which failed to produce the required change in resistance.

Further objects and features of the invention will be readily apparent to those skilled in the art from the specification and appended drawing illustrating a preferred embodiment, in which.

Figure 1:
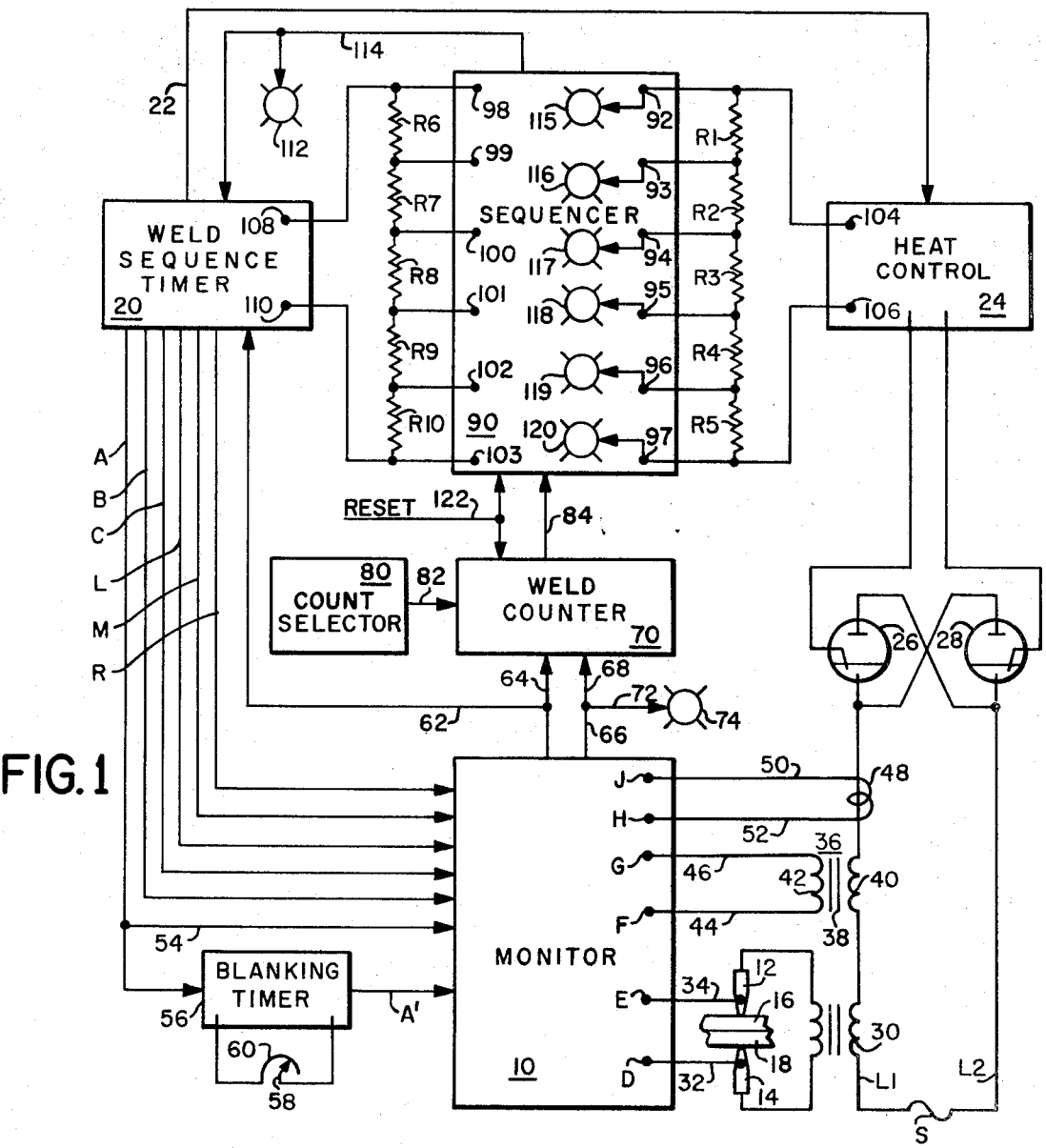
FIG. 1 is a function diagram of the elements of a control for a resistance welder according to the present invention.

In FIG. 1, a controller or monitor 10 for monitoring variations in resistance across a load in response to current flow through the load is shown with a resistance welder apparatus comprising a pair of electrodes 12 and 14 movable by means, not shown, into clamping engagement with two or more layered workpieces 16 and 18 which may vary in thickness or otherwise in electrical resistance. The monitor 10, which is fully disclosed and described in the Guettel patent —493, supra, is shown as used with a suitable weld sequence timer 20 which preferably is of the type disclosed in U.S. Pat. No. 3,267,303, issued Mar. 3, 1967 which has been assigned by the inventors Charles F. Meyer and James J. Eckl to the assignee of the present invention.

The weld timer 20 is arranged to provide an output signal through a lead 22 to a heat control circuit indicated by a numeral 24 which in turn provides signals to initiate the conduction of a pair of back to back connected ignitrons 26 and 28. The signals from the heat control 24 control the conduction of the ignitrons 26 and 28 and thereby the flow of alternating current from an alternating current source S through leads L1 and L2 to the electrodes 12 and 14. A circuit which is particularly suited for use as the heat control circuit 24 is fully disclosed in U.S. Pat. No. 3,258,697, issued June 28, 1966 which has been assigned by the inventor Marvin A. Guettel to the assignee of the present invention.

The weld timer 20 is arranged to control the duration of SQUEEZE, WELD, HOLD and OFF periods, as is well known in the resistance welding art. During the SQUEEZE period, the electrodes 12 and 14 move into engagement with the workpieces 16 and 18 under predetermined pressure. At the end of the SQUEEZE period, the timer 20 provides a suitable series of signals which are carried by the lead 22 to the heat control circuit 24 which a causes the ignitrons 26 and 28 to fire in a lead-trail fashion to pass alternate half-cycles of alternating current through the primary winding of a welding transformer 30 having a secondary winding connected to the welding electrodes 12 and 14. Additionally, the weld timer 20 and the heat control circuit 24 are arranged to cause the ignitrons 26 and 28 to conduct for adjustable periods less than full half-cycles of the alternating current supply and thus provide heat control for the welding apparatus. The timer 20 also provides for delayed firing during the initial half-cycle of conduction of the lead ignitron to minimize surge current transients in the welding transformer 30.

The weld timer 20 also provides signals through suitable leads designated as A, B, C, L, M and R to the monitor 10. The signals supplied to the leads B and C are negative voltage pulses delivered simultaneously with the lead-trail firing of the ignitrons 26 and 28. The signals supplied to the leads A, L and M are negative during the SQUEEZE, HOLD and OFF periods and are changed during the WELD period which preferably begins 85° after a zero point on the supply voltage wave. The signal to the lead A is reestablished at 85° after a zero point on the next wave of the supply voltage after termination of the WELD period. The signal to the lead L is reestablished at 355° after a zero point of the supply voltage wave during the last half-cycle of the welding current. The signal to the lead M is reestablished at a random point prior to said 355° point during the last half-cycle of welding current. The signal to the lead R is a negative voltage pulse which occurs at the end of the SQUEEZE period.

The monitor 10 has a plurality of signal-receiving input terminals D, E, F, G, H and J. The terminals D and E are connected through suitable leads 32 and 34 to the electrodes 12 and 14, respectively, so as to provide a pickup signal which is a function of the voltage appearing across the electrodes in response to the flow of welding current. The pickup signal is the sum of the voltage drops in the electrodes 12 and 14, the workpieces 16 and 18, the surface resistances between the electrodes and the workpieces 16 and 18 and also includes a variable induced voltage component. Because one of the purposes of the monitor 10 is to precisely detect changes in the interface resistance, preferably the leads 32 and 34 should be connected to detect only the interface resistance and to exclude the effects of the other resistances listed above. From a practical standpoint, however, it is desirable to connect the leads 32 and 34 directly to the electrodes 12 and 14 and to compensate the signal supplied to the terminals D and E for the effects of the of the other resistances, as disclosed in the Guettel et al. patent —493, supra.

A current transformer having an iron core 38 has its primary winding 40 effectively in series with the electrodes 12 and 14 by being connected in series with the primary winding of the transformer 30. The transformer 36 has a secondary winding 42 connected by a pair of leads 44 and 46 to the terminals F and G. Thus any variations in current through the welding electrodes 12 and 14 is reflected as a voltage change at the terminals F and G.

It is well known that a change in resistance occurs across workpieces, such as the workpieces 16 and 18, during formation of a resistance weld therebetween and that a gradual increase in this resistance occurs at the beginning of the WELD period when the workpieces start to heat. This increase in resistance is followed by a relatively stable period of resistance which in turn is followed by a decrease in resistance as the metal melts and a weld nugget starts to form.

Ohm's law teaches that the voltage drop across the metal parts, in response to welding current through the parts, is equal to the current flow times the resistance across the parts, or $E = IR$. Thus, if the signal from the electrodes 12 and 14 is not compensated for changes in the welding current, as may be caused by changes in the supply voltage as well as the changes in resistance across the parts being welded, the change in voltage will not be directly proportional to the changes in resistance across the parts. The monitor 10 circuitry, which includes the iron core transformer 36, is arranged to compensate the voltage signal across the leads 32 and 34 for changes in welding current flow through the electrodes 12 and 14.

An air core current transformer 48 is arranged to be energized by the current in the circuit which includes the transformer 30 and the welding electrodes 12 and 14. Preferably, the transformer 48 comprises one or more turns of wire about a lead which carries current to the welding electrodes 12 and 14 to form a secondary winding which has its respective ends connected through the leads 50 and 52 to the terminals J and H, respectively, thereby to provide a voltage signal at the terminals J and H which is a function of the welding current and which is substantially 90° out of phase with the welding current.

The welding current also provides a strong magnetic field about the electrodes, the strength of which depends upon the magnitude of the welding current and the shape and mass of the workpieces and other variable factors. This field induces an inductive voltage component in the leads 32 and 34 which obscures the voltage introduced in the leads 32 and 34 at the electrodes 12 and 14 by the resistance across the parts 16 and 18. The voltage drop caused by the resistance between the parts 16 and 18 is a maximum during each half-cycle when the welding current is a maximum. Similarly, as the inductive voltage component is a function of the rate of change of current, during the instants of maximum welding current flow during each half-cycle, the inductive voltage component will be at a minimum. The instant when the inductive component is at a minimum for each half-cycle is detected by means of the air core current transformer 48 which, in response to the flow of welding current provides a voltage signal 90° out of phase therewith so that, at each maximum point on the welding current wave, the voltage signal from the transformer 48 is zero. The voltage signal from the transformer 48, which is impressed on the monitor 10 at the terminals J and H, is used as a gating signal to control the sampling of the voltage signal appearing at the terminals D and E to eliminate the effects of the inductive voltages on the signals appearing across the leads 32 and 34.

Except during the welding interval, the weld timer 20 provides a continuous negative signal to the lead A. The signal at the lead A is directly supplied to the monitor 10 through a lead 54 and indirectly supplied to the monitor 10 through a blanking timer 56 via a lead A'. When the welding interval begins, the negative signal to the lead A is terminated. This change in the signal from the lead A is delayed in transmission to the monitor 10 by the blanking timer 56 for an adjustable amount, i.e., three cycles, so that sampling of the voltage across the electrodes 12 and 14 reflects a value uninfluenced by improper seating of the electrodes and other causes. After the negative signal at the lead A' disappears, the circuitry within the monitor 10 is controlled by the signals at the leads B, C, L, M and R.

Initially the negative signals from the timer 20 through the leads A, B, C, L, M and R reset or condition the monitor 10 to sample the resistance change between the workpieces 16 and 18 in response to the flow of welding current between the electrodes 12 and 14. The flow of welding current is initiated by a proper signal from the timer 20 through the lead 22 to the heat control 24 and the change in signals at the leads A, B, C, L, M and R, as described. The signals at the leads B and C, as well as the signals at the terminals J and H, are used as gating signals to control the sampling of the signal at the terminals D and E to nullify the effects of induced voltages on the signal appearing at the terminals D and E. A preselected time interval after the welding current begins to flow, as determined by an adjustment of a slider 58 and a potentiometer resistor 60, the blanking timer 56 causes the input signal change from the lead A to appear as an input signal change through the lead A' to the monitor 10. The monitor 10 in response to the change in the input signal at the lead A' begins to sample the voltage appearing across the terminals D and E and constantly compares the highest value of the sampled voltage with lesser values of the sampled voltage which subsequently appear between the terminals D and E as the resistance between the workpieces 16 and 18 decreases. The monitor 10, when the percentage difference between the initially sampled voltage and a subsequently sampled voltage equals a preselected value, supplies an output signal through a lead 62 to the timer 20 and a signal through a lead 64 to a counter 70.

The signal from the monitor 10 through the lead 62 sequences the timer 20 to end the WELD period and begin the HOLD period. The timer 20, at the end of the WELD period, terminates the signal through the lead 22 so that the heat control circuit 24 ceases to supply signals to switch the ignitrons 26 and 28 to conductive states to supply the electrodes 12 and 14 with welding current. Additionally, the timer at the end of the WELD period reestablishes the signals at the leads A, L and M, which resets the monitor 10 in a condition to sample the change in resistance between the workpieces 16 and 18 during the subsequent WELD period. The timer 20 is adjusted so that the WELD period as determined by the timer 20 normally is greater than the period required to form an acceptable weld between the workpieces 16 and 18 as detected by an occurrence of a predetermined change in resistance across the workpieces 16 and 18 in response to welding current flow.

In the event the monitor 10 fails to sense a predetermined percentage change in resistance across the welding electrodes 12 and 14 during the WELD period, as determined by the timer 20, the timer 20 will operate to remove the signal through the lead 22 to the heat control circuitry 24 to terminate the flow of welding current through the electrodes 12 and 14 and will supply an input signal to the monitor 10 through the lead M at some interval prior to 355° during the last half-cycle of welding current flow. The monitor 10, in response to the signal through the lead M in the absence of a detected predetermined percentage change in resistance across the welding electrodes 12 and 14, provides an output signal to the lead 66 which is delivered as an input signal to a weld counter 70 via a lead 68 and a signal via a lead 72 which causes an indicating lamp 74 to become illuminated thereby, indicating that an insufficient change in resistance occurred across the welding electrodes to provide a satisfactory weld during the time interval as dictated by the timer 20. The lamp 74 remains illuminated through the succeeding HOLD, OFF and SQUEEZE periods and at the end of the subsequent SQUEEZE period the monitor 10 receives a signal via the lead R which resets the monitor so the lamp 74 is extinguished and the signal via the lead 68 is removed.

The weld counter 70 may be constructed of suitable components, such as stepping relays or solid-state counting circuits, in a manner well known to those skilled in the art to which this invention pertains, to provide the functions which will be hereinafter described. As shown, the weld counter 70 receives input signals through the leads 64 and 68 from the monitor 10. Additionally, the weld counter 70 receives an input command from a count selector 80 through a lead 82 and supplies an output signal through a lead 84 to a sequencer circuit module indicated by a numeral 90. The sequencer 90 has one set of output terminals designated by numerals 92—97 and a second set of output terminals 98—103. Connected between the output terminals 92 and 93 is a resistor R1. Similarly connected between the output terminals 93—94, 94—95, 95—96, and 96—97 are resistors R2, R3, R4 and R5 which are connected in series with each other and in series with R1 across a pair of terminals 104 and 106 of the heat control circuit 24. Additionally connected between the output terminals 98 and 99 is a resistor R6 with resistors R7, R8, R9 and R10 connected respectively between the pairs of output terminals 99—100, 100—101, 101—102 and 102—103. The resistors R6—R10 are connected in series with each other across a pair of terminals 108 and 110 of the timer 20.

The sequencer 90 provides an output to the timer 20 and an indicating device, such as a lamp 112, via a lead 114 and is arranged to energize indicating lamps 115—120, depending upon the condition of the circuits within the sequencer 90.

The weld counter 70 includes suitable counting circuits as are well known which are programmed by the count selector 80 to provide an output signal at the lead 84 whenever the weld counter 70 is stepped from a reset condition a number of counting steps equal to the number of counting steps dictated by the count selector 80. The sequencer 90 also is basically a counter which is sequenced one counting step in response to each input signal at the lead 84 and is arranged to sequentially provide shorted electrical paths in parallel with the individual resistors R1—R5 and cause the indicating lamps 115—120, which are connected to the terminals 92—97, to be illuminated as the counting circuits within sequencer 90 are stepped in response to input signals from the weld counter 70. Further, the sequencer 90 is arranged to sequentially interrupt shorted electrical paths in parallel with the individual resistors R6—R10 as the counting circuits within the sequencer are stepped in response input signals from the weld counter 70.

The weld counter 70 is arranged so that whenever the monitor 10 supplies an output signal to the leads 62 and 64, indicating that a weld of acceptable quality has been formed within the time limit as dictated by the timer 20, the weld counter 70 will be reset to a zero count, even if previously stored counts are registered within the weld counter 70. In the event a weld of inferior quality is formed, the monitor 10 will fail to detect the desired percentage resistance change between the welded parts 16 and 18 during the weld period as dictated by the weld timer 20 and will supply an output signal to the lead 68. The weld counter 70 in response to a signal from the lead 68 is sequenced one counted step. When a sequence of unacceptable welds formed equal in number the number selected by the count selector 80, the weld counter 70 will supply an output signal via the lead 84 to the sequencer 90.

Figure 2:
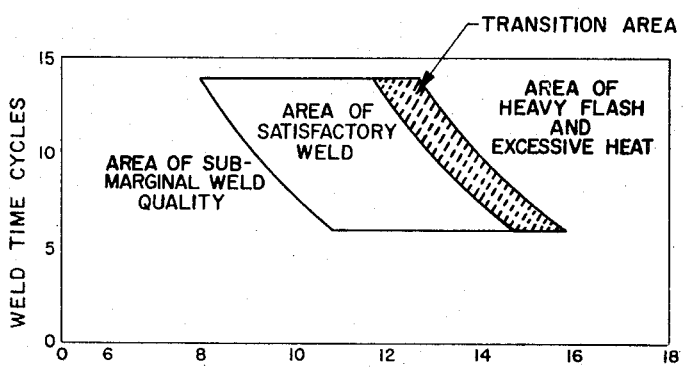
FIG. 2 is a graphic illustration of the interrelationship of weld time and weld current recommended to form satisfactory spot welds between metal parts.

In its initial, or reset condition, the sequencer 90 is arranged so that all of the resistors R1—R5 are included in the series circuit with the terminals 104 and 106 and all of the resistors R6—R10 in the series circuit with the terminals 108 and 110 are shorted by circuits within the sequencer 90. When the sequencer 90 is sequenced one count, the circuits within the sequencer 90 will provide a shorted path about the resistor R1, decreasing the resistance between the terminals 104 and 106. Similarly, the sequencer 90 will eliminate the shorted path about the resistor R6 so as to increase the resistance between the terminals 108 and 110. resistor Experience has shown that the quality of resistance spot welds is influenced by many variables and that satisfactory welds can be formed if these variables are closely controlled according to predetermined weld schedules. In FIG. 2, recommended weld current and weld times for a pair of sheets of low carbon steel having a thickness of .047 inches are shown, which are welded in apparatus which will provide 750 pounds force between the electrodes, with each electrode having a ¼ inch diameter flat truncated cone tip, which will provide a HOLD time of one cycle and a weld nugget diameter of .20 inches. It has been further determined that as the tips of the electrodes mushroom, an increased weld current and/or weld time is required to form satisfactory weld nuggets, so that in essence the area of satisfactory welds, illustrated in the graph in FIG. 2, migrates or progressively moves to the right and upwardly as the mushroom shape of the electrodes increases. Heretofore the practice has been to manually readjust the weld current to compensate for the mushrooming of the electrode tips.

The heat control circuit 24, as disclosed in the Guettel patent —697, supra, includes a timing capacitor and a potentiometer resistor. The timing circuit, including the potentiometer resistor and the capacitor, is arranged so that the capacitor is charged through the potentiometer resistor and the charge on the capacitor determines the instant during each half-cycle at which the ignitrons initiate conduction. Further, the timing circuit is arranged so that as the resistive value of the potentiometer resistor is decreased, the charging rate of the capacitor is increased and the ignitrons are triggered by the heat control circuit 24 to fire earlier during each of their respective half-cycles of conduction to thereby increase the weld current between the electrodes 12 and 14. The resistors R1—R5 in FIG. 1 replace the potentiometer resistor in the heat control circuit 24 and are connected in the charging circuit for the timing capacitor. Thus as the resistors R1—R5 are progressively shorted, the charging time for the timing capacitor within the heat control circuit 24 is progressively decreased so that the ignitrons are caused to fire earlier in their respective half-cycles to deliver increased welding current to the electrodes. Similarly, the weld timer 20 as disclosed in the Meyer et al. patent —303, supra, includes a timing capacitor which is charged through a variable timing resistor so that the length of the WELD period depends upon the resistance value of the timing resistor. The resistors R6—R10 are connected in the charging circuit for the timing capacitor in the sequence timer 20 so that as the resistors R6—R10 are progressively included in the circuit, the timing interval of the WELD period will be increased. Thus referring to FIG. 2, it will be seen that as the weld current and/or weld time is increased, the control is made to compensate for the effects of the mushrooming electrodes.

As previously stated, after the weld counter has received a predetermined number of input signals from the lead 68 which equal the count number selected by the count selector 80, an output signal will be transferred via the lead 84 to the sequencer 90. Thus the first output signal to the lead 84 will cause the sequencer 90 to be switched so that a shorting circuit is provided about the resistor R1 and the resistor R6 is included in its respective circuit which will cause the heat control 24 to increase the weld current flow and the weld sequence timer 20 to increase the length of the WELD period. Upon receipt of an additional count from the lead 84, after the monitor 10 has detected that a series of unsatisfactory welds have been made, after the heat control 24 has been previously sequenced by shorting the resistor R1 to cause the ignitrons to fire earlier in their respective half-cycles, the sequencer 90 will cause the resistor R2 to be shorted and the resistor R7 to be included in their respective circuits. The shorted resistor R2 will cause the heat control 24 to further increase the welding current flow while the inclusion of the resistor R7 in the circuit will cause the timer 20 to further increase the length of the WELD period. The foregoing will be similarly repeated to cause the resistors R3, R4, and R5 to be sequentially excluded in the heat control circuit so that the ignitrons are caused to progressively fire in incremental steps earlier in each of their half-cycles. Similarly, as the resistors R8, R9, and R10 are sequentially included in the timing circuit of the sequence timer 20, the timer 20 will incrementally increase the WELD time. After the sequencer 90 has been stepped a predetermined number of steps, so that all of the resistors R1—R5 or a selected number thereof have been excluded from the timing circuit of the heat control 24, the sequencer 90 will supply an output signal through the lead 114 to the timer 20 which will prevent the weld timer 20 from being sequenced to make additional welds. Also, the signal from the lead 114 will cause the indicating lamp 112 to be illuminated to indicate that the welding electrodes are in a condition which will require replacement or maintenance before further welding may be accomplished. As shown, the lamps 115—120 are each connected to receive an input from the terminals 92—97. The lamps 115—120 will indicate the state of the sequencer 90 to illustrate the state of the operation of the heat control. After the weld timer has received an input from the lead 114 and the electrode tips have been replaced or dressed as required, a suitable signal is supplied to the sequencer 90 and the weld counter 70 via a lead 122 which will reset the sequencer 90 and the weld counter 70 in its original state.

While certain preferred embodiments of the invention have been specifically disclosed, it is understood that the invention is not limited thereto, as many variations will be readily apparent to those skilled in the art and the invention is to be give given its broadest possible interpretation within the terms of the following claims.

We claim:

1. In a control circuit for a resistance welding apparatus wherein the operations of a pair of welding electrodes forming repeated spot welds between metal parts causes a progressive mushrooming of the portions of the electrodes engaging the metal parts, the combination comprising: current determining means for supplying the pair of electrodes with alternating current having a predetermined intensity while the electrodes are engaging the metal parts to be welded together, timing means providing a signal to the current determining means for determining a preselected time interval during which the electrodes are supplied with current, means for detecting resistance changes across the metal parts in response to current flow through the electrodes and supplying an output signal for causing the current determining means to terminate the current flow through the electrodes when a change in the resistance between an initially sampled resistance signal and a subsequent sampled signal equals a predetermined value and occurs during the time interval, sequencing means including a counter responsive to an input signal from the timing means and the output signal from the detecting means for sequencing the counting means one counting step upon each failure of the detecting means to supply an output signal during the time interval, means for presetting the counter for causing the counter to supply an output signal when the counter has been sequenced a predetermined number of successive counting steps, and means for causing the current determining means to change the intensity of current flow to the electrodes a predetermined incremental value in response to the output signal from the sequencing means.

2. In a control circuit for a resistance welding apparatus wherein the operations of a pair of welding electrodes forming repeated spot welds between metal parts causes a progressive mushrooming of the portions of the electrodes engaging the metal parts, the combination comprising: current determining means for supplying the pair of electrodes with alternating current having a predetermined intensity while the electrodes are engaging the metal parts to be welded together, timing means providing a signal to the current determining means for determining a preselected time interval during which the electrodes are supplied with current, means for detecting resistance changes across the metal parts in response to current flow through the electrodes and supplying an output signal for causing the current determining means to terminate the current flow through the electrodes when a change in the resistance between an initially sampled resistance signal and a subsequent sampled signal equals a predetermined value and occurs during the time interval, sequencing means including a counter responsive to an input signal from the timing means and the output signal from the detecting means for sequencing the counting means one counting step upon each failure of the detecting means to supply an output signal during the time interval, means for presetting the counter for causing the counter to supply an output signal when the counter has been sequenced a predetermined number of successive counting steps, and means for causing the timing means to change the time interval a predetermined incremental value in response to the output signal from the sequencing means.

3. The combination as recited in claim 1 including means for causing the timing means to change the time interval a predetermined incremental value in response to an output signal from the counter.

4. The combination as recited in claim 1 wherein the means for causing the change in the current determining means causes the current determining means to increase the current flow in incremental steps.

5. The combination as recited in claim 4 wherein the sequencing means including the counter is arranged to supply a repeated output signal in response to each repeated sequence of successive counting steps by the counter and the means for causing the change in the current determining means causes the current determining means to sequentially increase the current flow in incremental steps in response to each repeated output signal from the sequencing means.

6. The combination as recited in claim 1 wherein the detecting means includes a means for indicating an occurrence of an output signal from the detecting means.

7. The combination as recited in claim 5 wherein the sequencing means includes means for indicating the number of incremental steps the current determining means has been sequenced.

8. The combination as recited in claim 7 wherein the sequencing means includes a means providing an output signal to the timing means for preventing the timing means from supplying a signal to the current determining means when the counter has been sequenced to provide a predetermined number of repeated output signals.

9. The combination as recited in claim 3 wherein the means for causing the timing means to change the time interval causes the timing means to increase the duration of the time interval.

10. The combination as recited in claim 3 wherein the means for causing the timing means to change the time interval causes the timing means to decrease the duration of the time interval.

PO-1050
(5/69)

UNITED STATES PATENT OFFICE
CERTIFICATE OF CORRECTION

Patent No. 3,546,421                    Dated December 8, 1970

Inventor(s) Charles F. Meyer and Marvin A. Guettel

It is certified that error appears in the above-identified patent and that said Letters Patent are hereby corrected as shown below:

Col. 3, line 4, cancel "a"; line 50, cancel "of the" (secon occurrence.

Col. 6, line 21, after "response" insert --to--; line 47, insert a period (.) after "110"; same line, cancel "resistc same line, begin new paragraph reading "Experience has"

Col. 7, line 75, cancel "give"

SIGNED AND
SEALED
MAR 16 1971

(SEAL)
Attest:

Edward M. Fletcher, Jr.
Attesting Officer

WILLIAM E. SCHUYLER, JR.
Commissioner of Patents